United States Patent

Langhof et al.

Patent Number: 5,143,457
Date of Patent: Sep. 1, 1992

[54] ELASTIC PIVOTING SLIDE BEARING

[75] Inventors: Rolf Langhof, Offenbach; Hans-Kurt Kohl, Gorxheimertal, both of Fed. Rep. of Germany

[73] Assignee: Firma Carl Reudenberg, Weinheim/Bergstr., Fed. Rep. of Germany

[21] Appl. No.: 625,219

[22] Filed: Dec. 10, 1990

[30] Foreign Application Priority Data

Dec. 8, 1989 [DE] Fed. Rep. of Germany ....... 3940600

[51] Int. Cl.⁵ .................. F16C 33/04; F16C 27/02
[52] U.S. Cl. ..................... 384/276; 384/215
[58] Field of Search ........... 384/215, 220, 221, 222, 384/276, 280, 295, 297–300, 908, 909

[56] References Cited

U.S. PATENT DOCUMENTS

| 2,827,303 | 3/1958 | Herbenar | 384/215 |
| 3,094,376 | 6/1963 | Thomas | 384/297 X |
| 3,194,614 | 7/1965 | Thomas | 384/222 |
| 3,383,143 | 5/1968 | Schmidt | 384/215 |
| 3,604,771 | 9/1971 | Luzsicza | 384/125 |
| 4,109,978 | 8/1978 | Ernst et al. | 384/298 X |
| 4,685,184 | 8/1987 | Satkamp | 384/298 X |
| 4,767,108 | 8/1988 | Tanaka et al. | 384/147 X |

FOREIGN PATENT DOCUMENTS 1064597 4/1967 United Kingdom .

Primary Examiner—Thomas R. Hannon
Attorney, Agent, or Firm—Kenyon & Kenyon

[57] ABSTRACT

An elastic pivoting slide bearing comprising an inner sleeve (1) preferably of metallic material; a slide sleeve (2) preferably of a shrinkable polymer material, surrounding the inner sleeve (1), and a support sleeve (3) made of elastic rubber material immovably fixed to the outside of the slide sleeve (2). The slide sleeve (2) is comprised of a shrink tube which is designed to close upon itself in the circumferential direction and which is shrunk onto inner sleeve (1).

11 Claims, 2 Drawing Sheets

ELASTIC PIVOTING SLIDE BEARING

FIELD OF THE INVENTION

The invention relates to an elastic pivoting slide bearing including an inner sleeve preferably of metallic material, surrounded by a polymeric slide sleeve, and a support sleeve made of elastic rubber fixedly attached to the outside of the slide sleeve.

BACKGROUND OF THE INVENTION

A conventional pivoting slide bearing is described in GB Patent No. 1,064,597. This design utilizes a slide sleeve (intermediate bush 2) that is circumferentially pressed by an outer supporting sleeve (rubber jacket 5) against an inner sleeve (bush 1) formed by a bushing. The slide sleeve is provided with a longitudinal slit (11) to facilitate a good sliding fit between the inner sleeve and sliding sleeve. A disadvantage of this design is that its load bearing capacity varies depending on the orientation of the longitudinal slit after the bearing has been installed. It may be possible to reduce variation in the load bearing capacity by providing a helical longitudinal slit; however, this would entail increased manufacturing costs.

U.S. Pat. 4,767,108, the text of which is incorporated herein by reference, discloses a pivoting slide bearing that incorporates a sliding sleeve in the form of a pair of plastic bushings (18,18) that are circumferentially continuous and compressed against an inner sleeve. This design does not require a longitudinal slit to provide a sliding fit because the inside diameter of the sliding sleeve is sized with respect to the outer diameter of the inner sleeve to provide a clearance that permits relative rotation. However, the sliding sleeve in this design can wear quickly causing undesirable enlargement of the clearance. In automobile suspension/steering mechanisms such an enlarged clearance (play) can, for example, lead to rattling noises when the vehicle is driven over bumps in the road.

OBJECTS AND SUMMARY OF THE INVENTION

An object of this invention is to provide a pivoting slide bearing which is easy and economical to manufacture and which ensures that the slide sleeve and inner sleeve freely rotate relative to each other and one inside the other, while reducing unwanted play between them.

The present invention provides an elastic pivoting slide bearing comprising an inner sleeve having a cylindrical outer surface; a slide sleeve shrunk into a rotatable engagement with the outer surface comprised of a circumferentially continuous shrinkable tube material; and a support sleeve surrounding and fixedly attached to said slide sleeve. Preferably, the slide sleeve is shrunk to about 50% to about 80% of its maximum shrinkage and comprises a plastic that can be vulcanized with high-energy radiation, such as, a polymer selected from the group consisting of polyethylene, polyvinylidene fluoride, polyamide and polytetrafluroethylene. The polymer is preferably cross-linked to about 40% to about 60%.

A lubricant coating can be applied to the outer surface of the inner sleeve to improve the relative rotation between the slide sleeve and the inner sleeve. The lubricant may comprise, for example, a wax and/or PTFE and, in many cases, also reduces the danger of corrosion.

In one embodiment at least one ring surface protrudes radially outward from the outer surface of the inner sleeve and the slide sleeve covers the protruding ring surface. In another embodiment two ring surfaces protrude radially outwardly from the outer surface at opposing ends of the inner sleeve and are preferably symmetrical having mirror-image configurations. The ring surfaces serve as a stop faces and limit axial movement of the slide sleeve on the inner sleeve.

The present invention also provides a method for making an elastic pivoting slide bearing, comprising the steps of positioning an inner sleeve in a slide sleeve comprised of a circumferentially shrinkable tube; shrinking the slide sleeve into a rotatable engagement with an outer surface of the inner sleeve; and affixing, preferably adhesively, a support sleeve to the slide sleeve. The adhesive connection between the slide sleeve and the support sleeve made may be realized by directly prevulcanizing the material forming the support sleeve onto the outer surface of the slide sleeve. In doing this, however, one must choose material combinations to prevent the properties of the slide sleeve from being disadvantageously altered during the vulcanization process. To have a greater selection in this respect, it is possible to fabricate the support sleeve in a separate work step and then press a slide sleeve, previously shrunk onto an inner sleeve, into the recess of the support sleeve.

In the preferred embodiment of the pivoting slide bearing according to the invention, the slide sleeve is comprised of a shrink tube designed to close upon itself in the circumferential direction, and the shrink tube is shrunk onto the outside diameter of the inner sleeve. Shrink tubes are generally known, but heretofore, they have been used in applications where a completely immovable fixation on a supporting inner sleeve is desired, for example, on the core of a cylinder. Shrink tubes can be designed as molded components and can be reduced in diameter (shrunk) through a subsequent heating.

The present invention employs a simple means, i.e., the shrinkage capacity of the shrink tube which constitutes the slide sleeve, to rotatably engage the slide sleeve and the inner sleeve in a manner which is free from play, but still allows relative rotating capability. In this sense, the application of the shrinking step makes it unnecessary to adjust the inside diameter size of the slide sleeve to the outside diameter of the inner sleeve or to provide the slide sleeve with a longitudinal slit in order to obtain a load carrying capacity which is neutral to orientation of an installed bearing.

It appears to be particularly advantageous to shrink the tube only to 50 to 80% of its maximum shrinkage capacity, in order to avoid engagement between the outside diameter of the inner sleeve and the inner diameter of the slide sleeve that is too tight to permit their relative rotation and the remaining shrinkage capability compensates for normal wear and tear during operation.

A particularly preferred material for the shrink tube is polyethylene for cost reasons. After shrinking a polyethylene shrink tube into rotatable engagement with the outer surface of an inner sleeve, one may initially find a seemingly rigid affixation to the outer surface. However, this engagement is simply sticking and is usually rotatable after a one-time relative rotation of the slide sleeve on the inner sleeve. The required force is surprisingly low, and thereafter the sticking effect may be eliminated even during extended periods of use.

In many applications, it is desirable limit axial movement of the slide sleeve on the inner sleeve in both axial directions. For these applications, the invention provides that the inner sleeve be configured with ring surfaces of the above type. These ring surfaces are located near opposing ends of the inner sleeve and they oppose each other in the axial direction. The two ring surfaces may be disposed relative to each other with a mirror-image configuration and design. The ring surfaces can form an acute angle with respect to the axis of the pivoting slide bearing.

BRIEF DESCRIPTION OF THE DRAWINGS

The above and other objects and advantages of the invention will be more apparent and better understood when considered in connection with the following drawings, in which.

DETAILED DESCRIPTION OF THE INVENTION

Figure 1:
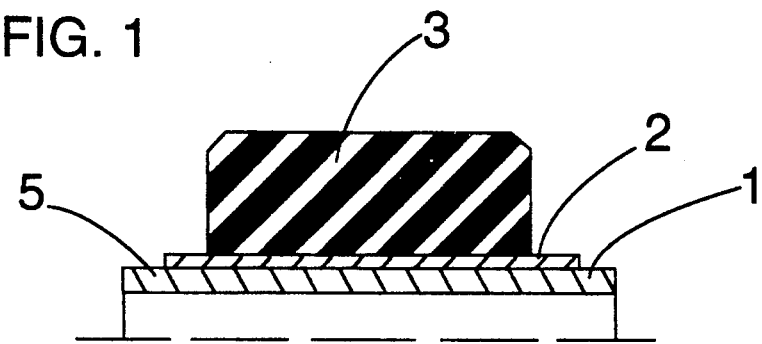
FIG. 1 is a fragmentary cross-section view of an elastic pivoting slide bearing including an inner sleeve of hollow-cylindrical shape coated with a lubricant.

The elastic pivoting slide bearing depicted in FIG. 1 is intended for use in steering/suspension mechanisms of motor vehicles. It comprises an inner sleeve 1 of a metallic material, which is configured as a bushing and is provided on the outside with a continuous coating of a lubricant 5 and serves to reinforce the slide sleeve 2.

The inner sleeve 1 can also be made of a non-metallic material, for example, a glass-fiber-reinforced plastic, a ceramic or a glass. The slide sleeve 2 is made of polyethylene polymer, which preferably has a degree of cross-linking of about 48%. In the shrunk-on state, the wall thickness of the slide sleeve is about 1 mm.

The slide sleeve 2 is shrunk onto the inner sleeve 1 and then the combined structure is pressed into the support sleeve 3. The inside diameter of the support sleeve 3 is elastically expanded by the outer surface of slide sleeve 2 and friction-locked thereon. The support sleeve 3 may comprise rubber elastic material of a Shore A hardness of about 64.

In normal operational use, the elastic pivotal bearing of this invention is fixed in position in an inflexible lug on a receiving construction. The lug is sized to cooperatively engage the support sleeve's 3 outer surface to provide radial compression of the support sleeve 3.

Figure 2:
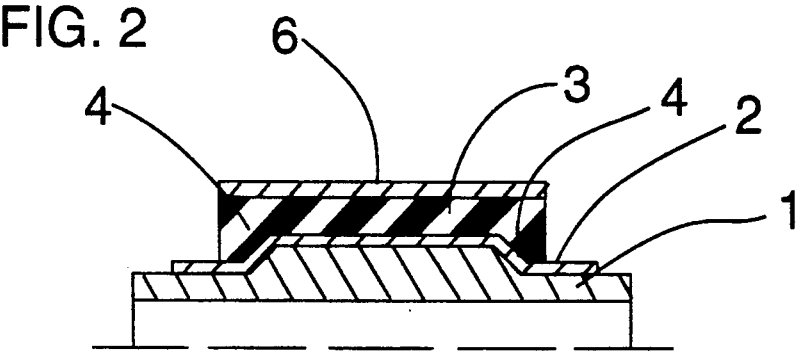
FIGS. 2, 3 and 5 are fragmentary cross-section views of alternative embodiments of elastic pivoting slide bearings in which the slide sleeve covers the inner sleeve in the vicinity of guide surfaces formed by protruding rings.
Figure 3:
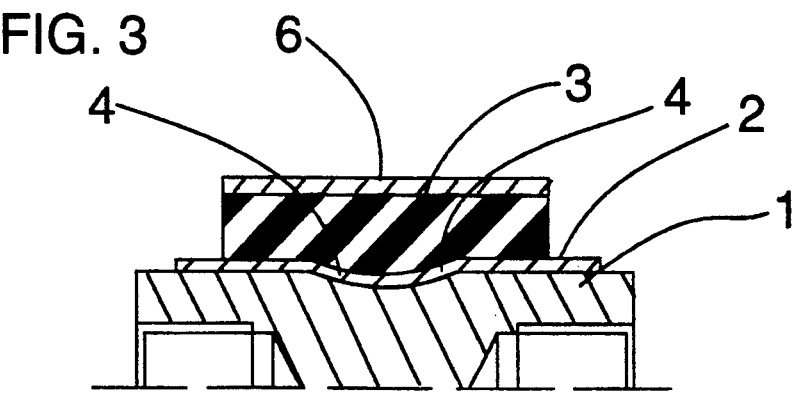

The embodiments depicted in FIGS. 2 and 3 are similar to the embodiment described above. They differ in that the slide sleeve 2 (shrink tube) and the inner sleeve 1 contact each other in the vicinity of the two ring surfaces 4. These ring surfaces form an acute angle with the longitudinal axis of the inner sleeve and have symmetrical mirror-image configurations with respect to each other. This results in the shrink tube 2 being guided in the axial direction on the inner sleeve 1, in a manner that limits axial movement of the slide sleeve 2 in both directions. The supporting sleeve 3 may be connected to a metallic sleeve 6 which surrounds it on the outside by direct prevulcanization and attachment to the outer surface of the side sleeve 2 may be accomplished by axial pressing.

Figure 4:
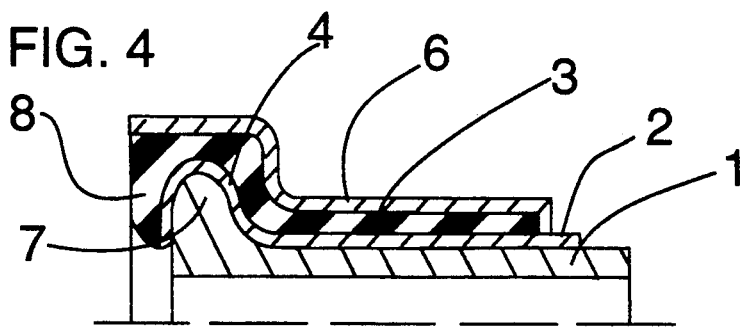
FIG. 4 is a fragmentary cross-section view of an elastic pivoting slide bearing, in which the inner sleeve is provided with a protruding ring surface extending in the radial direction and covered by the slide sleeve.

In principle, the embodiment depicted in FIG. 4 is similar to those described above. However, it differs in that it only has one ring surface 4 extending in the outward radial direction. This ring surface 4 defines a flange-type ring projection 7 of the inner sleeve 1 on one side. The ring surface extends predominantly in the radial direction and is rounded off into the remaining area of the outside of the inner sleeve 1. The ring surface 4 is completely covered by the slide tube 2. The support sleeve 3 is an elastic rubber material affixed by direct prevulcanization to the inside of a metallic sleeve 6. The assembly is thereby made in such a way that an additional sealing lip 8 results in the area of the ring projection of the inner sleeve 1. This lip sealingly contacts the ring projection 7 in the vicinity of the side lying axially opposite the ring surface 4.

Figure 5:
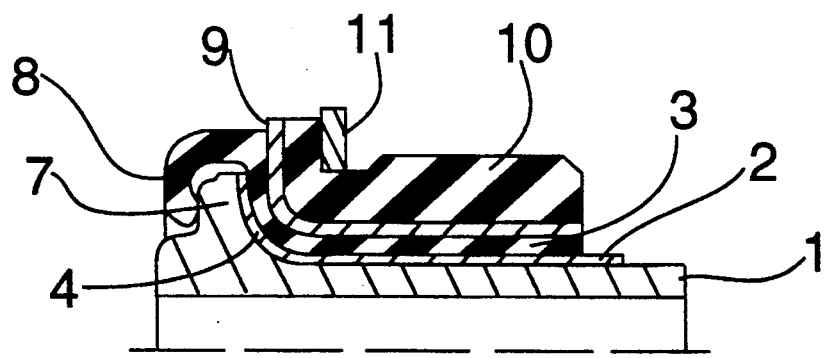

The embodiment depicted in FIG. 5 differs from the those described above in that the flexible support sleeve 3 is surrounded on the outside by a prevulcanized adapter sleeve 9. This adapter sleeve 9, in turn, is embedded in a spring member 10 made of rubber, which is provided with a bearing retainer 11 extending in the radial direction. The slide sleeve 2 is a molded component, which has an angular profile and contacts the ring projection 7 in the axial direction on one side only. The side sleeve 2 wall thickness is substantially uniform in all subsections at about 1.5 mm.

What is claimed is:

1. An elastic pivoting slide bearing comprising:
   an inner sleeve having a cylindrical outer surface;
   a slide sleeve shrunk into a rotatable engagement with said outer surface comprised of a circumferentially continuous shrinkable tube material; and
   a support sleeve surrounding and fixedly attached to said slide sleeve.

2. The bearing according to claim 1, wherein the slide sleeve is shrunk to about 50% to about 80% of its maximum shrinkage.

3. The bearing according to claim 2, wherein the slide sleeve is comprised of a polymer selected from the group consisting of polyethylene, polyvinylidene fluoride, polyamide and polytetrafluroethylene.

4. The bearing according to claim 3, wherein the plastic is polyethylene polymer about 48% cross-linked; and the support sleeve is a rubber material having a Shore A hardness of about 64.

5. The bearing according to claim 3, wherein the slide sleeve comprises a plastic that can be vulcanized with high-energy radiation.

6. The bearing according to claim 4, wherein the slide sleeve polymer is about 40% to about 60% cross-linked.

7. The bearing according to claim 1, further comprising a lubricant coating on the outer surface of the inner sleeve.

8. The bearing according to claim 1, further comprising at least one ring surface protruding radially outward from the outer surface of the inner sleeve and the slide sleeve covers the ring surface.

9. The bearing according to claim 1, further comprising two ring surfaces protruding radially outwardly from the outer surface at opposing ends of the inner sleeve.

10. The bearing according to claim 9, wherein the ring surfaces are symmetrical and have mirror-image configurations.

11. The bearing according to claim 10, wherein the support sleeve and slide sleeve are adhesively attached to each other.

* * * * *